United States Patent [19]

Miyazawa

[11] Patent Number: 4,677,496
[45] Date of Patent: Jun. 30, 1987

[54] IMAGE READER FOR IMAGE PROCESSING APPARATUS

[75] Inventor: Hideyuki Miyazawa, Kawasaki, Japan

[73] Assignee: Ricoh Company, Ltd., Tokyo, Japan

[21] Appl. No.: 738,187

[22] Filed: May 28, 1985

[30] Foreign Application Priority Data

May 28, 1984 [JP] Japan .............................. 59-106568
Jun. 27, 1984 [JP] Japan .............................. 59-131160

[51] Int. Cl.⁴ .......................................... H04N 1/04
[52] U.S. Cl. .................................. 358/285; 358/293; 358/294
[58] Field of Search ....................... 358/293, 294, 285

[56] References Cited

U.S. PATENT DOCUMENTS

4,424,590  1/1984  Ozawa ............................ 358/293
4,500,927  2/1985  Ozawa ............................ 358/293
4,566,040  1/1986  Ozawa ............................ 358/293
4,567,529  1/1986  Yamaguchi ...................... 358/293

Primary Examiner—Michael A. Masinick
Attorney, Agent, or Firm—Oblon, Fisher, Spivak, McClelland & Maier

[57] ABSTRACT

An image reader applicable to a document or image reading section of a facsimile apparatus or the like and equipped with a line image sensor. Light-sensitive cells of the line image sensor are divided into blocks which in turn are sorted by the order of arrangement into a plurality of groups. The blocks in one group are switched from one to another while outputs of the other group are selected. The light-sensitive cells constituting the respective blocks are classified into a plurality of groups by the order of arrangement, so that the different groups are driven in parallel.

8 Claims, 7 Drawing Figures

IMAGE READER FOR IMAGE PROCESSING APPARATUS

BACKGROUND OF THE INVENTION

The present invention relates to an image reader for a facsimile apparatus or like image processing apparatus and, more particularly, to an image reader which shortens a reading time and frees image signals from noise.

Image reading means installed in an image processing apparatus, such as a document reader of a facsimile apparatus, is implemented using a line image sensor which functions to decompose one line of images into pixels and then subject them to photoelectric conversion. Generally, a line image sensor comprises a light-sensitive section where a plurality of light-sensitive elements such as photodiodes are arranged in an array, and a signal selector section where output signals of the light-sensitive elements are sequentially selected. The basic construction of such a line image sensor is shown in FIG. 1.

Figures 1, 2:
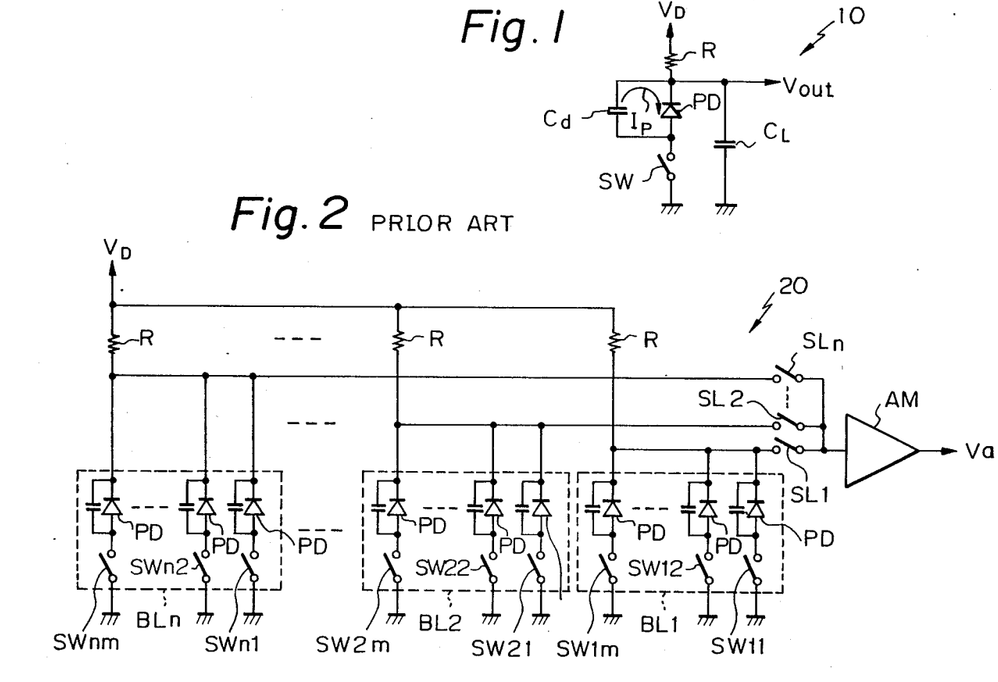
FIG. 1 shows an equivalent circuit of a basic construction of an image sensor.
FIG. 2 shows a prior art image reader installed in a line image sensor.

In the line image sensor, generally 10, shown in FIG. 1, a capacitance Cd represents a coupling capacitance of a photodiode, or light-sensitive element, PD, while $C_L$ represents a capacitance developing in a wiring between the photodiode PD and a circuit to follow (e.g. amplifier). A resistor R is a current-limiting resistor. A switch SW comprises a MOS (metal oxide semiconductor) switch or like semiconductor element. A voltage $V_D$ is applied to the line image sensor 10 from a power source, not shown.

Suppose that the switch SW is turned on to charge the capacitances Cd and $C_L$ and then turned off to set up an image signal storing condition. In this condition, a photocurrent complementary to a quantity of received light, i.e., a pixel luminance associated with a read image, develops in the photodiode PD to discharge the capacitance Cd. When the switch SW is turned on again, the photodiode PD produces an output voltage Vout which based on charge conservation is expressed as:

$$Vout = V_D - (Ip \cdot T/(Cd + C_L)) \quad \ldots \text{Eq. (1)}$$

where T is the interval between consecutive turnons of the switch SW, or image information storing period.

Meanwhile, in the case where the whole charge stored in the capacitance Cd is discharged by the photocurrent Ip which flows during the storing time T, the output voltage Vout of the photodiode, or saturation output Vsat, is produced by:

$$Vsat = C_L \cdot V_D/(C_L + Cd) \quad \ldots \text{Eq. (2)}$$

Hence, the output Vout of the photodiode PD varies from the source voltage $V_D$ to Vsat complementarily to the photocurrent Ip which flows over the storing time T, i.e. the luminance of the associated pixel. In this manner, image signals corresponding to pixel densities are provided.

Assume a line image sensor which reads an A4 format document eight dots per millimeter and has a reading width of 216 millimeters. Such a line image sensor, therefore, comprises the above-mentioned photodiodes PD and switches SW in 1,728 pairs in total. Where this type of line image sensor is driven as a single element, the capacitance $C_L$ increases to a significant level. The Eq. (2) teaches that an increase in the capacitance $C_L$ is reflected by a decrease in the level of the saturation output Vsat which in turn narrows the available dynamic range.

An implementation heretofore employed to preserve a desirable dynamic range consists in dividing the light-sensitive cells of a line image sensor into a plurality of blocks and driving the cells on a block-by-block basis. For example, 1,728 pairs of photodiodes PD and switches SW have been divided into 27 blocks each comprising 64 pairs. An example of such a prior art image reader is shown in FIG. 2. In the image reader 20 shown in FIG. 2, photodiodes PD and switches SW are each divided into n blocks each comprising m photodiodes or switches, while outputs of the individual blocks BL1–BLn are applied to an amplifier AM via switches SL1–SLn. A controller (not shown) controls the switches SL1–SLn, SW11–SW1n and SWn1–SWnm as indicated by waveforms a to j in FIG. 3, whereby one complete line of picture signals Va are produced.

Figure 3:
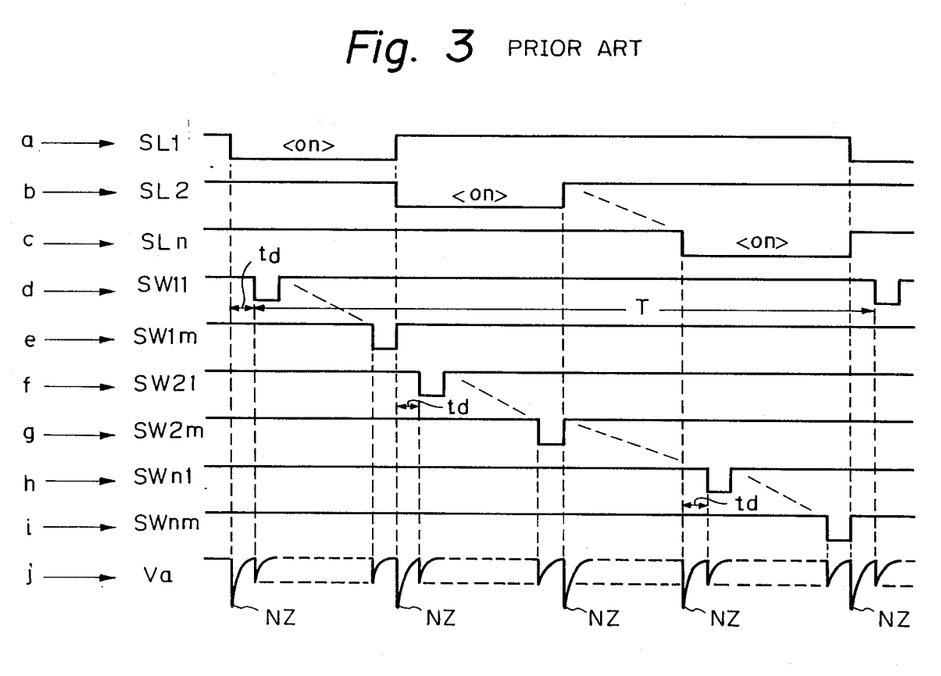
FIG. 3 is a timing chart representative of the operation of the image reader shown in FIG. 2.

First, after the switch SL1 associated with the block BL1 has been turned on, the switches SW11–SW1m are sequentially turned on each for a charging period so as to apply output signals of the respective photodiodes PD to the amplifier AM. As the block BL1 is fully read, the switch SL1 is turned off and, instead, the switch SW2 is turned on to read the next block BL2. Thereafter, the same procedure is sequentially repeated on the other blocks down to BLn.

The problem with the prior art image reader of the type described is that noise NZ entailed by the turnon and turnoff of the switches SL1–SLn, which precede the amplifier AM to designate the blocks BL1–BLn, has great influence on picture signals Va. It therefore has been common practice to set up a delay td between a switching action of any of the switches SL1–SLn and the subsequent start of operation of the associated block BL, thereby preventing noise NZ from being introduced into the image signals. However, this is at a cost, a longer time necessary for the reader to read one line of pixels. Although a preamplifier may be interposed between each of the switches SL1–SLn and its associated block BL1–BLn in order to minimize the influence of noise NZ on the image signals Va, such is undesirable from the economy standpoint because the same number of preamplifiers as the blocks, n, would be required.

Meanwhile, in reading a signal out of each cell, it is necessary to preserve the on state of the associated switch SW for a certain period of time (hereinafter referred to as a charging time) so that the capacitances $C_d$ and $C_L$ may be charged, as previously stated. The charging time is determined by a time constant which is provided by multiplying a sum of the capacitances $C_d$ and $C_L$ by a resistance value R. Usually, since the output width of a cell should be reduced beyond a certain limit, it is impossible to employ an excessively small resistance value R and, therefore, an excessively short charging time. The result is the need for a certain reading time per cell and, as a whole, a substantial period of time consumed in reading one line of image signals. While the reading time may be shortened by driving all the blocks at the same time, such cannot be implemented without provision of a parallel-to-serial converter and other converting means which convert outputs of the respective blocks into one line of time-serial signals, resulting in an intricate construction which adds to the space and cost. Another possible approach for a shorter reading time is improving the response characteristics of the cells. This approach is disadvantageous in that a decrease in the coupling capacitance of a photodiode is accompanied by a decrease in the saturation output Vout which inherently narrows the output width.

SUMMARY OF THE INVENTION

It is therefore an object of the present invention to provide an image reader for an image processing apparatus which eliminates the drawbacks particular to the prior art techniques as discussed above.

It is another object of the present invention to provide an image reader for an image processing apparatus which remarkably shortens a picture signal reading time.

It is another object of the present invention to provide an image reader for an image processing apparatus which frees image signals from the influence of noise.

It is another object of the present invention to provide a generally improved image reader for an image processing apparatus.

In accordance with one aspect of the present invention, there is provided an image reader in which a plurality of light-sensitive cells arranged in an array in a line image sensor are divided into a predetermined number of blocks, the blocks are sorted by an order of arrangement into at least a first group and a second group, and the blocks are sequentially selected to be driven. The image reader comprises block selectors associated in one-to-one correspondence with the blocks for selecting one of the blocks in any of the first and second groups and driving the light-sensitive cells in the selected block, and group selectors for selecting one of the first and second groups. Each of the block selectors is started to operate at a predetermined timing while another of the block selectors selecting and operating one of the blocks which belongs to the other group is operated.

In accordance with another aspect of the present invention, there is provided an image reader in which a plurality of light-sensitive cells arranged in an array in a line image sensor are divided into a predetermined number of blocks, the light-sensitive cells constituting each of the blocks are sorted by an order of arrangement into at least two groups, one of the groups in the respective blocks provides a first group sequence and the other a second group sequence, and the respective blocks are sequentially selected to be driven. The image reader comprises group selectors associated respectively with the first and second groups for selecting respectively the groups in the first and second group sequences and driving the light-sensitive cells in the selected groups, and group sequence selectors for selecting one of the first and second group sequences. The group selectors associated with the respective groups operate at the same time for a predetermined period of time to simultaneously drive the light-sensitive cells in the groups belonging to the different group sequences one out of each of the groups, thereby driving the group sequences in parallel with a predetermined lag therebetween.

The above and other objects, features and advantages of the present invention will become more apparent from the following detailed description taken with the accompanying drawings.

DESCRIPTION OF THE PREFERRED EMBODIMENTS

While the image reader for an image processing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 4:
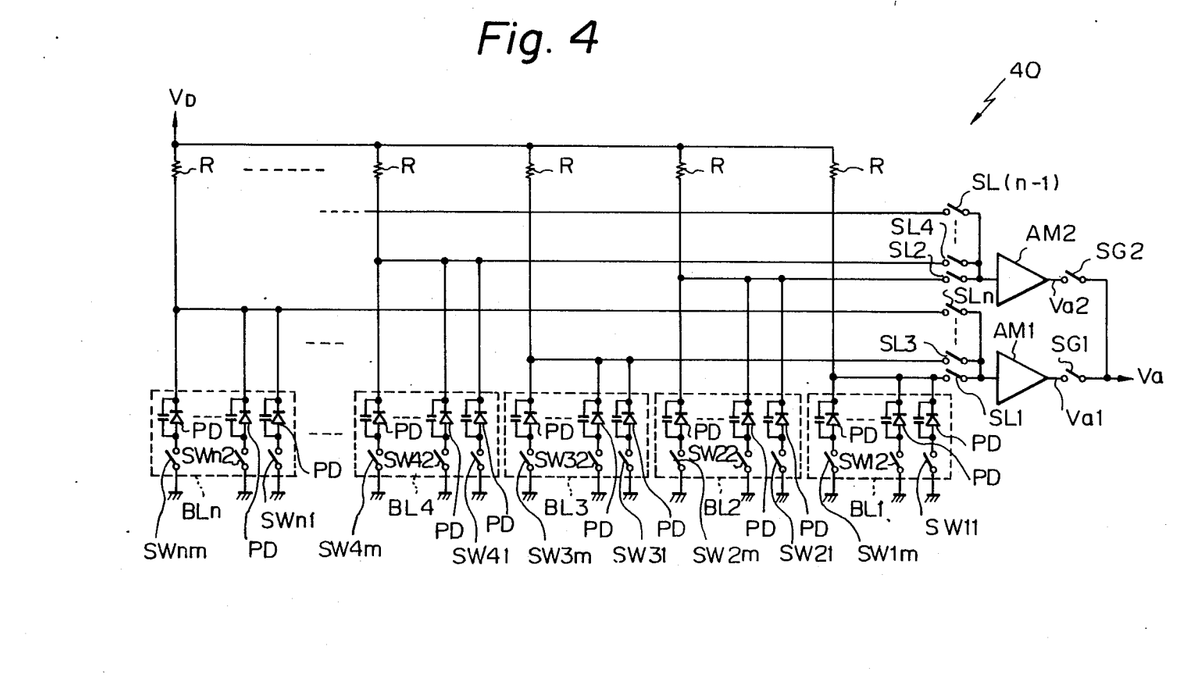
FIG. 4 is a circuit diagram showing an image reader embodying the present invention.
Figure 5:
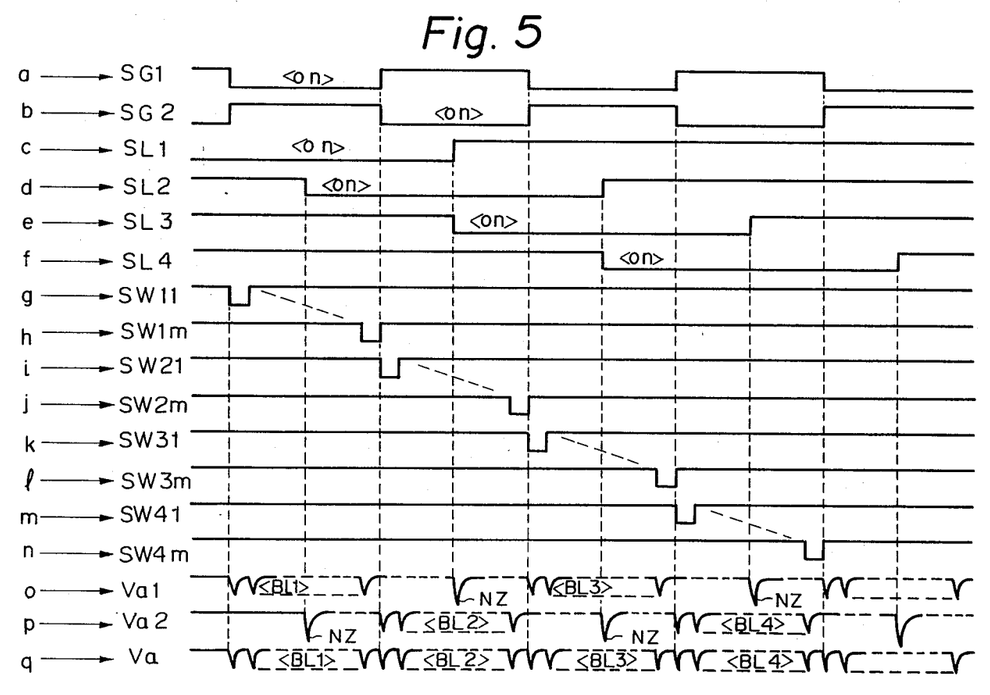
FIG. 5 is a timing chart representative of the operation of the image reader shown in FIG. 4.

Referring to FIGS. 4 and 5, an image reader embodying the present invention is shown. In FIGS. 4 and 5, the same or similar structural elements as those shown in FIGS. 2 and 3 are designated by like reference numerals.

As shown in FIG. 4, assuming that the image reader, generally 40, comprises an image sensor made up of N photodiodes PD and N switches SW, the photodiodes PD and the switches SW are each divided into n blocks BL1–BLn each comprising m photodiodes or switches, i.e. $N=m\cdot n$. The switches are labeled $SW_{11}$, $SW_{12}$, $\sim$, $SW_{1m}$, $SW_{21}$, $SW_{22}$, $\sim$, $SW_{2m}$, ..., $SW_{n1}$, $SW_{n2}$, $\sim$, and $SW_{nm}$. Assuming that the resolution is 8 dots per millimeter and the reading width is 216 millimeters, then N is 1,728 which provides twenty-seven blocks each comprising 64 photodiodes and 64 switches. In this case, n is "27" which is an odd number. As mentioned, in this particular embodiment, the number n of blocks is odd and, among the blocks, odd ones BL1, BL3, ..., BLn belong to a first group and even ones BL2, BL4, ..., BL(n−1) to a second group.

Output signals of the blocks BL1, BL3, ..., BLn belonging to the first group are applied to an amplifier AM1 via switches SL1, SL3, ..., SLn, respectively. On the other hand, output signals of the blocks BL2, BL4, ..., BL(n−1) belonging to the second group are applied to an amplifier AM2 via switches SL2, SL4, ..., SL(n−1). An image signal Va1 associated with the first group and output from the amplifier AM1 and an image signal Va2 associated with the second group and output from the amplifier AM2 are fed to a circuit to follow (not shown) as an image signal Va by way of switches SG1 and SG2, respectively.

As represented by waveforms a and b in FIG. 5, the switches SG1 and SG2 are each exclusively on-off controlled. While the switch SG1 is turned on, a block belonging to the first group is driven and, at a suitable timing, a switch adapted to apply outputs of a block to be driven next to the amplifier AM2 (i.e. switch belonging to the second group) is turned on and, at the same time, a switch adapted to apply outputs of a block driven just before the block then being driven (i.e. switch belonging to the second group) is turned off. While the switch SG2 is turned on, on the other hand, a block belonging to the second group is driven and, at a suitable timing, a switch adapted to apply outputs of a block to be driven next is turned on and, at the same time, a switch adapted to apply outputs of a block driven just before the block then being driven is turned off. As a result, image signals Va1 output from the blocks which belong to the first group and image signals Va2 output from the blocks which belong to the second group are sequentially linked to complete one line of picture signals Va.

In detail, at the start of scanning operation of the line image sensor, the switch SL1 is turned on (see a waveform c in FIG. 5) to select the block BL1 which is associated with a scan start position. As the switch SG1 is turned on at a scan start timing, the switches SW11–SW1m adapted to activate their associated photodiodes PD are sequentially turned on (see waveforms g and h in FIG. 5). During the block BL1 drive period, the switch SL2 adapted to apply outputs of the next block BL2 to the amplifier AM2 is turned on at a suitable timing (see a waveform d in FIG. 5). As a result, the image signals Va1 output from the amplifier AM1 (see a waveform o in FIG. 5) are fed to the following circuit as image signals Va (see a waveform q in FIG. 5).

Although turnon of the switch SL2 introduces noise NZ into the image signals Va2, the noise NZ does not appear in the eventual image signals Va because the signals Va2 are not selected at that time.

When the drive of the block BL1 has been completed, the switch SW1 is turned off and the switch SG2 is turned on. Timed to the turnon of the switch SG2, the block BL2 begins to be driven to sequentially turn on the switches SW21–SW2m (see waveforms i and j in FIG. 5). During the block BL2 drive period, the switch SL3 associated with the next block BL3 is turned on at a suitable timing (see waveform e in FIG. 5) and the switch SL1 is turned off. Therefore, the image signals Va2 which are output from the amplifier AM2 while the block BL2 is driven are delivered to the next device as image signals Va.

Again, while the turnon and turnoff of the switch SL1 develop noize NZ in the image signals Va1, the noize NZ do not show itself in the eventual image signals Va because the signals Va1 are not selected at that time.

As the drive of the block BL2 is completed, the switch SG2 is turned off and, instead, the switch SG1 is turned on. Timed to the turnon of the switch SG1, the block BL3 begins to be driven to sequentially turn on the switches SW31–SW3m (see waveforms k and l in FIG. 5). At a suitable timing during the block BL3 drive period, the switch SL4 associated with the next block BL4 is turned on (see a waveform f in FIG. 5) and, at the same time, the switch SL2 is turned off. Thereafter, upon completion of the drive of the block BL3, the switch SG1 is turned off and the switch SG2 is turned on to sequentially turn on the switches SW41–SW4m in the block BL4 (see waveforms m and n in FIG. 5). During this drive priod, the switch SL5 associated with the next block BL5 is turned on at a predetermined timing (not shown) and, instead, the switch SL3 is turned off.

The above-described sequence of events is repeated to select the other blocks one by one to deliver one complete line of image signals.

Although noise is also entailed by the turnon and turnoff of the switches SG and SG2, it does not affect the eventual image signals Va partly because the image signals Va1 and Va2 respectively are amplified by the amplifiers AM1 and AM2 and partly because the output impedance of the amplifiers AM1 and AM2 is low.

As described above, since the switches SL1–SLn assigned respectively to the blocks BL1–BLn are turned on and off while image signals associated with the other group are selected, image signals are freed from noise developing when the switches SL1–SLn are turned on and off. This eliminates the need for a delay otherwise required between a block switch timing and a drive start timing, thereby shortening the reading time.

The present invention may be practiced with an even number of blocks, n, instead of the odd number of blocks shown and described. Further, the number of groups is not limited to two and may be three or more.

Summarizing the construction in accordance with the illustrative embodiment, light-sensitive cells of a line image sensor are divided into blocks, the blocks are sorted by the order of arrangement into a plurality of groups, and blocks belonging to one group are switched from one to the other while outputs of a block belonging to the other group is selected. In this construction, noise appearing upon switching of the block is not introduced into image signals and, therefore, the reading time of a line image sensor is shortened.

Figure 6:
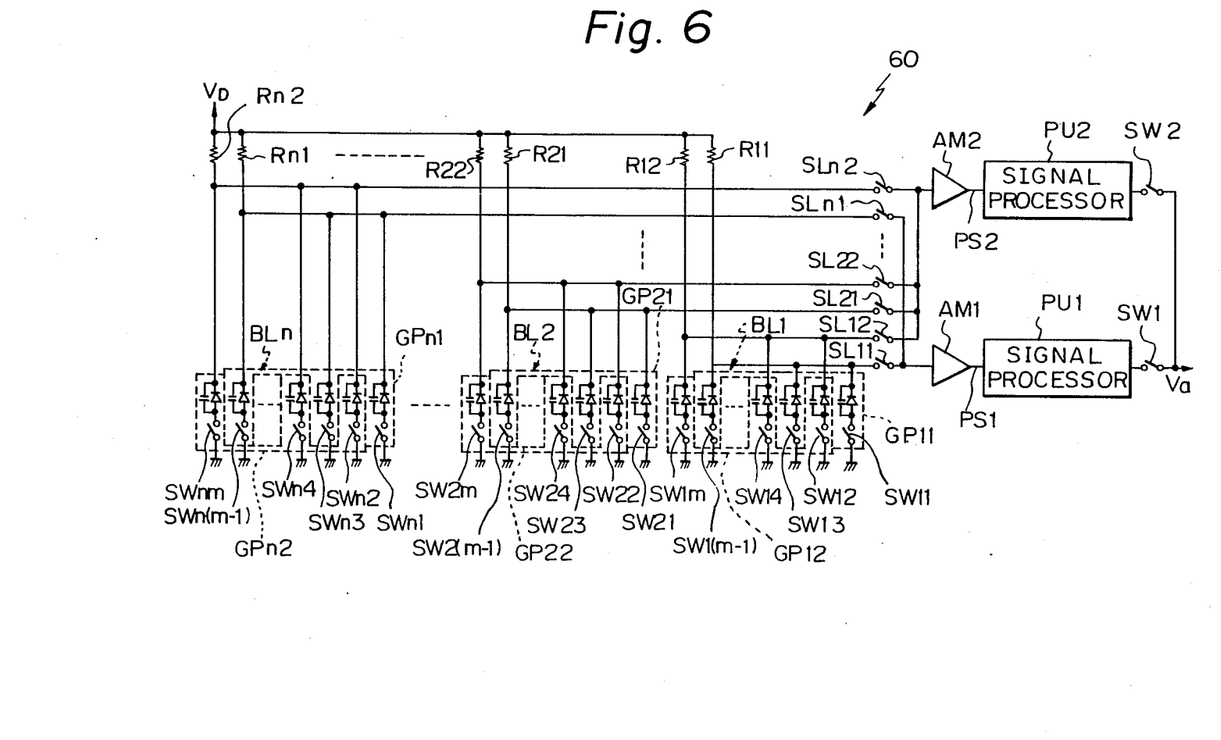
FIG. 6 is a circuit diagram showing another embodiment of the present invention.
Figure 7:
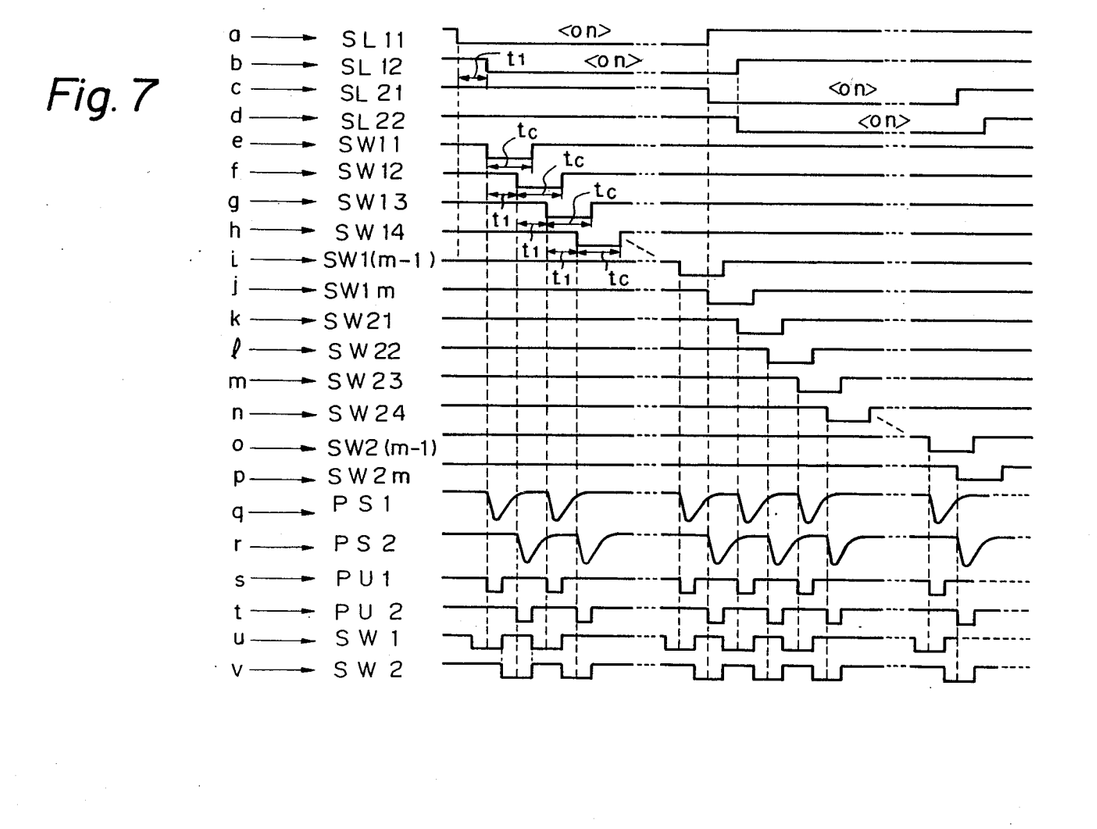
FIG. 7 is a timing chart representative of the operation of the image reader shown in FIG. 5.

Referring to FIGS. 6 and 7, another embodiment of the present invention is shown and generally designated by the reference numeral 60. In FIGS. 6 and 7, the same or similar structural elements as those shown in FIG. 4 and 5 are designated by like reference numerals.

As shown in FIG. 6, the image reader 60 comprises photodiodes PD and switches SW for activating the photodiodes PD. The photodiodes PD and the switches SW are divided each in m's (m being an even number) to provide n block BL1, BL2, . . . , BLn. Further, the respective blocks BL1, BL2, . . . , BLn are subdivided to provide groups GP11, GP21, . . . , GPn1 each comprising odd photodiodes PD and odd switches SW as counted in the scanning sequence, and groups GP12, GP22, . . . , GPn2 each comprising even photodiodes PD and even switches SW. A power source voltage $V_D$ is applied to the groups GP11, GP21, . . . , GPn1 via resistors R11, R21, . . . , Rn1, respectively. Outputs of the groups GP11, GP21, . . . , GPn1 are routed to an amplifier AM1 via switches SL11, SL21, . . . , SLn1. The power source voltage $V_D$ is applied to the groups GP12, GP22, . . . , GPn2 via resistors R12, R22, . . . , Rn2, respectively. Outputs of the groups GP12, GP22, . . . , GPn2 are applied to an amplifier AM2 via switches SL12, SL22, . . . , SLn2. The output PS1 of the amplifier AM1 is fed to a signal processor PU1 and the output PS2 of the amplifier AM2 to a signal processor PU2, the signal processors PU1 and PU2 serving a sample/hold or like function. The outputs of the signal processors PU1 and PU2 respectively are routed through switches SW1 and SW2 to the next circuit as image signals Va.

In this particular embodiment, the groups GP11, GP21, . . . , GPn1 are sequentially driven, and the groups GP12, GP22, . . . , GPn2 also sequentially but with a predetermined lag relative to the groups GP11, GP21, . . . , GPn1. Such parallel drive of the two group sequences substantially halves the time required for reading one line of information. An example of such a manner of drive is shown in FIG. 7. In the timing chart of FIG. 7, it should be noted that the low levels of each waveform represents "on" or operative states.

First, the switch SL11 is turned on and then the switch SL12 with a delay of a time $t_1$. In this condition, the switch SW11 in the group GP11 is turned on for a charging time $t_c$ so that an output of the associated photodiode appears as a signal PS1 amplified by the amplifier AM1. Timed to appearance of the signal PS1, the signal processor PU1 is activated. In the meantime, the switch SW1 is turned on to deliver an output of the signal processor PU1 as an image signal Va.

Upon the lapse of a time $t_1$ after the turnon of the switch SW11, the switch SW12 in the group GP12 is turned on for a charging time $t_c$ to apply an output of the associated photodiode as a signal SP2 via the amplifier AM2. Timed to the appearance of the signal SP2, the signal processor PU2 is activated. In this instance, the switch SW1 is turned off and the switch SW2 is turned on, whereby the output of the signal processor PU2 is produced as an image signal V via the switch SW2.

During the on period of the switch SW12, the switch SW11 is turned off and, subsequently, the switch SW13 is turned on for a charging time $t_c$. As a result, the output of the next photodiode in the group GP11 is read out, then amplified by the amplifier AM1, then processed by the signal processor PU1, and then delivered via the switch SW1 as an image signal Va.

The switch SW12 is turned off and, upon the lapse of a time $t_1$ after the turnon of the switch SW13, the switch SW14 is turned on for a charging time $t_c$. Consequently, the output of the next photodiode in the group GP12 is read out, then amplified by the amplifier AM2, then processed by the signal processor PU2, and then delivered as an image signal Va via the switch SW2.

The procedure described so far is sequentially repeated for each of the following photosensors in the groups GP11 and GP12.

When a time $t_1$ has expired after the turnon of the last switch SW1(m−1) in the group GP11, the switch SL11 adapted to select the group GP11 is turned off and the switch SL21 adapted to select the group GP21 is turned on. Thereafter, the group GP21 will be driven in the same manner as the group GP11.

Further, when a time $t_1$ has elapsed after the turnon of the switch SW1m in the group GP12, the switch SL12 associated with the group GP12 is turned off and the switch SL22 associated with the group GP22 is turned on. This will cause the group GP22 to be driven in the same manner as in the group GP12.

The above-described sequence of events is repeated for each of the other consecutive groups so as to read out one complete line of image signals Va.

Concerning the delay $t_1$ involved in the drive of the groups GPi1 and GPi2 (i=1, 2, ..., n), any suitable time may be selected in consideration of matching with the processing system, insofar as it is shorter than the charging time $t_c$.

The signal processors PU1 and PU2 may be of the kind which performs analog-to-digital conversion, instead of the sample/hold function described above. The signal processors PU1 and PU2 are even omissible if the functions assigned thereto are fulfilled by a circuitry which follows the switches SW1 and SW2.

As described above, in accordance with this particular embodiment, the group GPi1 sequence and the group GPi2 sequence are driven in parallel with a short time lag. The resulting time necessary for reading one line of image signals Va is substantially one half the time of the prior art device, realizing fast readout operations.

In the illustrative embodiment, as described above, m photosensors constituting one block is subdivided into two groups by the order of arrangement so as to drive the two group sequences in parallel. However, the number of groups is not limited to two and may be three or more in which case, assuming that the number of groups is n, the total reading time assigned to one complete line of image signals Va will be 1/n.

Summarizing the construction in accordance with the second embodiment of the present invention, photosensors (light-sensitive cells) constituting one block are divided into a plurality of groups along the array so that the respective groups may be driven in parallel. This offers a considerable reduction of the time required to read one line of image signals. In addition, peripheral circuitries associated with such a sensor are very simple in construction and, therefore, space- and cost-effective.

Various modifications will become possible for those skilled in the art after receiving the teachings of the present disclosure without departing from the scope thereof.

What is claimed is:
1. An image reader comprising:
a plurality of light-sensitive cells arranged in an array in a line image sensor and divided into a plurality of blocks;
a plurality of first switches with each switch being connected to no more than one cell in each block;
a plurality of second switches with each switch being associated with one block and being connected to each cell in that block for driving said cells;
a plurality of third switches with each of said switches being associated with a group of second switches;
said first switches being driven to sequentially activate the cells within a block;
said second switches being driven to sequentially activate said blocks;
said third switches being driven to selectively activate said groups;
wherein said second switches are closed and opened during the time that the corresponding third switch is opened so as to prevent noise from being generated and for shortening the reading time.

2. An image reader as claimed in claim 1, wherein the number of the blocks is odd, a first group comprising odd ones of the blocks and a second group comprising even ones of the blocks.

3. The image reader according to claim 1, further comprising a plurality of amplifiers with one amplifier associated with each group for receiving the output of said second switches of said group and for providing an input to said third switch of said group.

4. An image reader according to claim 1, wherein a first switch is provided for each cell.

5. An image reader comprising:
a plurality of light-sensitive cells arranged in an array in a line image sensor and divided into a plurality of blocks;
a plurality of first switches with each switch being connected to no more than one cell in each block;
a plurality of second switches for driving said cells with each block being associated with a plurality of switches and each switch being connected to only a fraction of the cells within that block;
a plurality of third switches, equal in number to the number of switches associated with each block, with each of said third switches being connected to a group of second switches including one of said second switches in each block;

said first switches being driven to sequentially activate the cells within a block;

said second switches being driven to sequentially activate the fractions of said block;

said third switches being driven to selectively activate said groups;

wherein said second switches are closed and opened during the time that the corresponding third switch is opened so as to prevent noise from being generated and for shortening the reading time.

6. The image reader according to claim 5, further comprising a plurality of amplifiers with one amplifier associated with each of said third switches for receiving the outputs of a plurality of second switches associated therewith and providing an input to the associated third switch.

7. The image reader according to claim 5, further comprising a plurality of signal processors, with one signal processor being associated with each of said third switches, said signal processor having an output connected to the input of the corresponding third switch.

8. The image reader according to claim 5, wherein a first switch is provided for each cell.

* * * * *